United States Patent [19]

Berlin et al.

[11] 4,359,880
[45] Nov. 23, 1982

[54] BACKLASH FREE SHEAR JOINT

[75] Inventors: Joseph B. Berlin, Mercer Island; James B. Skilton, Renton, both of Wash.

[73] Assignee: The Boeing Company, Seattle, Wash.

[21] Appl. No.: 165,897

[22] Filed: Jul. 3, 1980

[51] Int. Cl.³ .............................................. F16D 3/56
[52] U.S. Cl. .................................................... 464/33
[58] Field of Search ....................................... 64/28 R

[56] References Cited

U.S. PATENT DOCUMENTS

| 1,244,945 | 10/1917 | Bell | 64/28 R |
| 2,094,584 | 10/1937 | Cox | 64/28 R |
| 2,863,514 | 12/1958 | Payne | 64/28 R |
| 3,060,706 | 10/1962 | Hess | 64/28 R |
| 3,082,684 | 3/1963 | Sturla | 64/28 R |
| 3,236,337 | 2/1966 | Marland et al. | 64/28 R |
| 4,086,012 | 4/1978 | Buckley et al. | 64/28 R |

FOREIGN PATENT DOCUMENTS 54-137690 10/1979 Japan .................................. 64/28 R Primary Examiner—Ira S. Lazarus
Assistant Examiner—Magdalen Moy
Attorney, Agent, or Firm—James P. Hamley; Nicolaas DeVogel; Bernard A. Donahue

[57] ABSTRACT

Side plate members have a connecting clevis at one end and portions which encircle and clear the hub of a flanged hub member at the other end. Shear pins mount in holes provided in the flange and side plates such that relative motion between the hub and clevis is prohibited. The side plate members are flexible along the axis of the pins to prevent galling or reseizing caused by the rough edges of fractured pins.

1 Claim, 3 Drawing Figures

BACKLASH FREE SHEAR JOINT

BACKGROUND OF THE INVENTION

The present invention pertains to the mechanical connector art and, more particularly, to a backlash free, continued relative rotation shear joint.

Numerous shear pin joints have been developed in the prior art. Such joints are used in applications wherein a drive source is to be connected to a variable load. If the load exceeds a predetermined value, it is desirable to disconnect the source from the load to prevent damage to the source, the linkage or the load itself.

A particularly critical application of a shear joint is found in the commercial aviation art. Here, various control surfaces of the aircraft such as ailerons and elevators are driven by powered actuators which are controlled via linkage systems, either by the aircraft's avionics or by the pilot. If a critical component fails or a linkage becomes jammed, it is imperative that the failed component or frozen linkage be sheared out of the system thereby permitting continued, alternate control of the actuator. A further advantage of such joints is that if a shear joint is located strategically in a system, the downstream linkage need be designed only for the shear out load value, thereby minimizing both structure and weight.

It is crucial in such avionic controlled flight systems that there be absolutely no backlash between the control input and the powered actuator. Avionic systems often respond to backlash by oscillations, or electronic "hunting" which can result in less system stability than is desirable.

Further, it is important that once the shearing action has occurred there cannot be an unintended reseizing of the control linkage to the frozen element. This reseizing or resultant galling might happen, for example, due to rough edges of the sheared pin rubbing against adjacent surfaces as system operation continues. With such reseizure, it might become impossible for the pilot, through his control, to manually operate the system.

In addition, it is desirable that the mechanism, after shearing has occurred, remain substantially intact and allow relative motion of the input and output mechanisms whereby the unit is easy to repair and there is no chance of portions of the linkage separating and becoming jammed or creating a jam, in other, adjacent equipment.

SUMMARY OF THE INVENTION

It is an object of this invention, therefore, to provide an improved backlash free shear joint.

It is a further object of the invention to provide the above described backlash free shear joint which eliminates galling or reseizing once the shearing action has taken place.

It is an additional object of the invention to provide the above described disconnect shear joint which allows continued alignment, and relative motion of the input and output members once shearing action has taken place.

Briefly, according to the invention, the backlash free shear joint is comprised of a flanged hub which has a hub portion adapted to be secured to a shaft and a flange extending from the hub in a direction substantially normal to the longitudinal axis of the hub. The flange is provided with at least two holes, each hole being predeterminedly located thereon. A pair of side plate members have at one end a portion dimensioned to encircle the hub with a predetermined clearance thereabout and, at their common end, attachment means for attaching the side plates to utilization structure. Each side plate is provided with at least two holes configured to align with the holes in the flange. Shear pins are located in an aligned pair of the flange and side plate holes for preventing relative motion between the flanged hub and the side plate members until the shearing of the pins.

Preferably, first and second shear pins are positioned at radii $r_A$ and $r_B$ from the attachment means, where $r_B$ is greater than $r_A$. The radii $r_A$, $r_B$ and the clearance of the side plates about the hub are designed such that at a predetermined loading between the hub and the side plates, the side plates rotate about the second pin until the first shear pin shears. The first pin is designed to shear prior to the hub engaging the encircling portion of the side plates. This causes the encircling portions of the plate members to engage the hub, thus forming a reaction point such that the second pin is sheared if the loading exceeds a second predetermined value, which may be lower than said first pin predetermined shear value.

Also, preferably, the side plates are formed of a selected material in a predetermined shape such that they are capable of flexing in a direction parallel to the longitudinal axis of the shear pins whereby galling, reseizing or high friction caused by the sheared edges of a shear pin is eliminated.

DETAILED DESCRIPTION OF THE PREFERRED EMBODIMENT OF THE INVENTION

Figure 1:
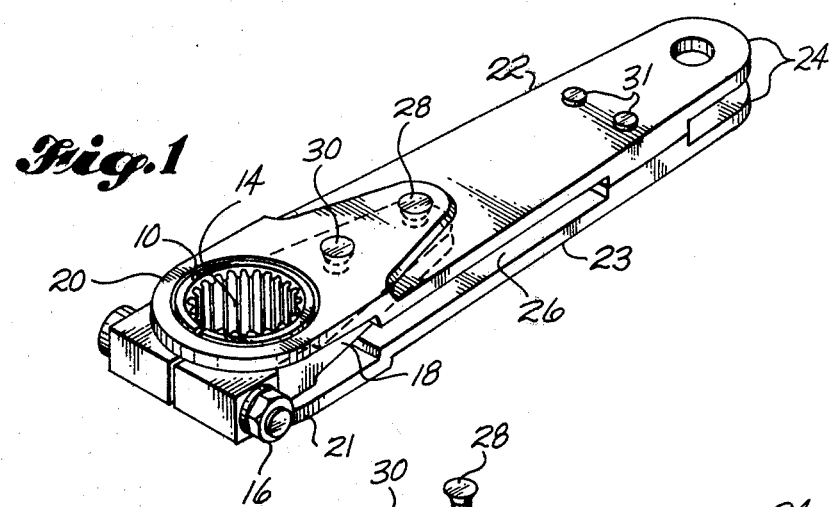
FIG. 1 is an isometric view of a preferred embodiment of the present shear joint.

FIG. 1 is an isometric view of the preferred embodiment of a bellcrank type shear joint according to the invention. Here a flanged hub 10 is adapted to be secured to a rotating shaft (see 12 of FIG. 3) via provided splines 14 and locking bolt and nut 16. Extending from the hub, in a direction generally normal to the longitudinal axis of the hub is a flange portion 18.

Encircling the hub, and providing a predetermined clearance thereabout (see FIG. 3) are ends 20, 21 of side plate members 22, 23. The common end 24 forms a forked clevis, adapted to be connected to utilization structure, such as linkage to the control surface actuator of an aircraft.

The side plate members 22, 23, which are secured together by fasteners 31, form a central opening 26 which receives the flange 18 of the flange hub 10. A pair of shear pins 28, 30, here illustrated as rivets, are secured through aligning holes in the flange 18 and side plate members 22, 23 for securing the side plates to the hub flange 10, thereby preventing backlash between the shaft 12 and the utilization structure connected to the forked clevis 24.

Figure 2:
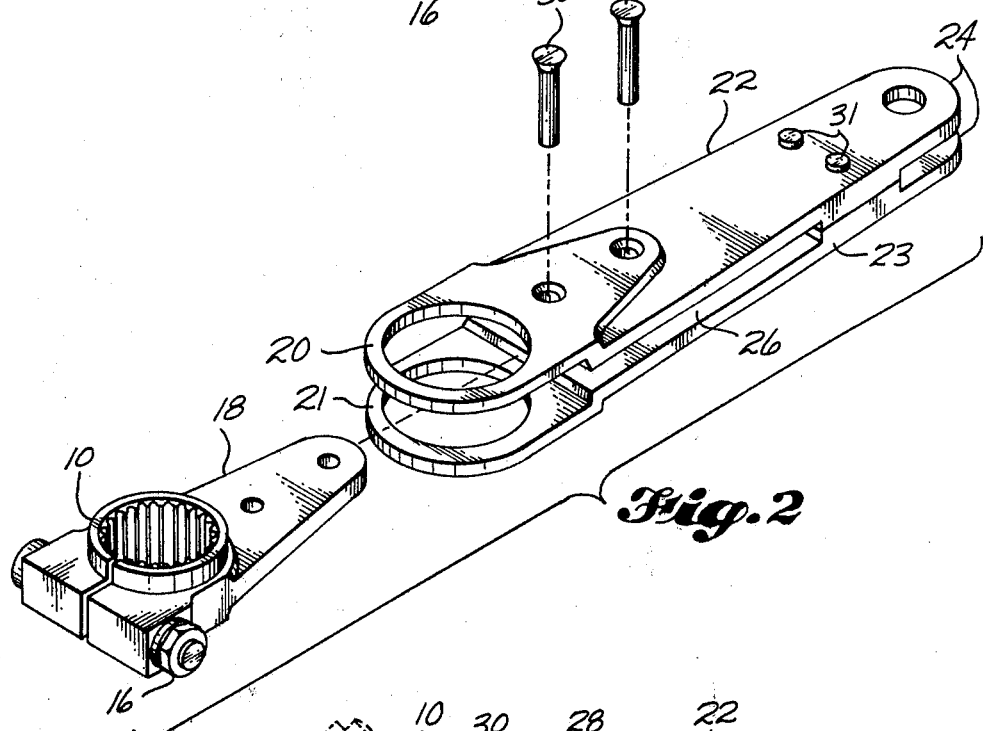
FIG. 2 is an exploded view of the shear joint shown in FIG. 1.

FIG. 2 is an exploded view of the shear joint showing the assembly of the hub flange structure 10, the side plate members 22, 23 and the shear pins 28, 30.

Figure 3:
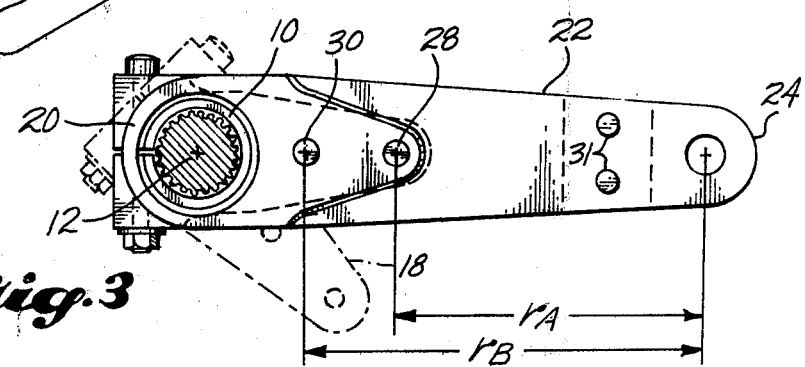
FIG. 3 is a top plan view of the shear joint shown in FIG. 1 illustrating rotation of the hub flange after shearing.

FIG. 3 is a top plan view of the shear joint assembly. As described with respect to FIG. 1, this shows the hub 10 with its extending flange 18. The side plate members 22, 23 have ends 20, 21 which encircle the hub 10 with a predetermined clearance thereabout. A clevis, suitable for connection to utilization structure, is connected to the common end 24 of the side plates 22, 23. A pair of shear pins 28, 30, which are located in aligning holes provided in the side plates 22, 23 and flange 18, secure the clevis at flange end 24 for rotation with a shaft which is secured to the hub 10.

Operation of the present shear joint will be understood as follows. A rotational torque applied to the shaft 12 is transmitted through the flange hub 10, shear pins 28, 30 and side plate members 22, 23 to the utilization structure attached at end 24.

If the load at the end 24 reaches a predetermined value the first pin 28 begins to shear due to the fact that it is at a lesser radius $r_A$ from end 24 than the second shear pin 30 which is at a radius $r_B$. During the process of shearing the first pin 28, the side plate members 22, 23 rotate about the second pin 30. The clearance between the hub 10 and the side members is sufficiently large to assure that the first pin 28 will completely shear prior to contact of the side members 22, 23 with the hub 10. Once the first pin 28 is severed, further rotation occurs about the second pin 30 until contact is made between the side members 22, 23 and the hub 10. Further application of load will shear the second pin 30, this load being more or less than the load required to shear the first pin 28, depending on requirements of the design.

Subsequent to complete fracture of both pins 28, 30 the side plate members 22, 23 remain constrained by the hub 10 but are free to rotate about the hub, thus maintaining linkage continuity.

The side plate members 22, 23 are designed such that they are flexible in a direction along the axis of the pins 28, 30 so that galling, reseizing, or high friction caused by the rough sheared edges of the pins 28, 30 during continued operation after shear out is obviated.

In summary, a backlash free shear joint has been described which prevents galling or reseizing of the joint components while maintaining linkage continuity after shear out.

While a preferred embodiment of the invention has been described in detail, many modifications and variations thereto are possible, all of which fall within the true spirit and scope of the invention.

For example, while a preferred bellcrank type device has been described in detail, it should be understood that the invention applies to any torque transmitting member driven by linkages, cables and so forth where the herein described shear device may be incorporated.

We claim:

1. A backlash free shear joint comprising:
 a flanged hub member having a hub portion adapted to be secured to a shaft and a flange extending from said hub in a direction substantially normal to the longitudinal axis of said hub portion, said flange being provided with at least two colinear radially disposed holes, from the hub;
 a pair of side plate members, each member having at one end a portion dimensioned to encircle said hub portion with a predetermined clearance thereabout and having at its other end attachment means for attaching said side plate to utilization structure, said side plates being provided with holes configured to align with said flange holes, said holes being colinear and at predetermined radii $r_A$, $r_B$ from said attachment means, where $r_B > r_A$;
 at least two shear pins, each shear pin being located in the aligned pair of said flange and side plate holes for preventing relative motion between said flanged hub and said side plate members until a predetermined differential force between the hub and the side plate shears said pins;
 said clearance of said side plates about said hub being selected such that at a predetermined loading between said flanged hub and said side plate member said first shear pin shears prior to the hub engaging the encircling portion of the side plates, and thereafter said side plate members rotate about said second shear pin until the side plate encircling portions engage the hub with said second pin shearing if said loading exceeds a second predetermined value; and
 wherein said side plate members are formed of a selected material in a predetermined shape such that they are capable of flexing in a direction parallel to the longitudinal axis of said shear pins whereby galling, reseizing or high friction caused by the sheared edges of a sheared pin is eliminated.

* * * * *